(12) United States Patent
Dietze

(10) Patent No.: US 10,953,502 B2
(45) Date of Patent: Mar. 23, 2021

(54) FASTENER ERROR PROOFING TOOL

(71) Applicant: GM GLOBAL TECHNOLOGY OPERATIONS LLC, Detroit, MI (US)

(72) Inventor: Robert H. Dietze, Brighton, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 186 days.

(21) Appl. No.: 16/361,945

(22) Filed: Mar. 22, 2019

(65) Prior Publication Data
US 2020/0298354 A1    Sep. 24, 2020

(51) Int. Cl.
B23P 19/06    (2006.01)
B62D 65/02    (2006.01)

(52) U.S. Cl.
CPC ............. B23P 19/06 (2013.01); *B23P 19/066* (2013.01); *B23P 2700/50* (2013.01); *B62D 65/02* (2013.01)

(58) Field of Classification Search
CPC ..... B23P 19/06; B23P 19/066; B23P 2700/00; B62D 65/02
See application file for complete search history.

(56) References Cited

U.S. PATENT DOCUMENTS

| | | | | |
|---|---|---|---|---|
| 2,878,342 A * | 3/1959 | Arthur | ..................... | G01V 3/04 200/61.09 |
| 3,368,431 A * | 2/1968 | Kulaga | ................... | B25B 23/10 81/54 |
| 4,787,136 A * | 11/1988 | Majic | ..................... | B23P 19/066 29/709 |
| 5,289,886 A * | 3/1994 | Shikata | ................. | B23P 19/066 173/181 |
| 6,269,996 B1 * | 8/2001 | McAllister | .............. | B27F 7/006 227/111 |
| 6,960,910 B2 * | 11/2005 | Lin | ........................ | G01D 5/145 324/207.2 |
| 7,032,480 B2 * | 4/2006 | Schindler | .............. | B23P 19/066 81/429 |
| 8,668,084 B2 * | 3/2014 | Benczkowski | ......... | B23P 19/06 206/338 |
| 2008/0178713 A1 * | 7/2008 | Long | ..................... | B23P 19/066 81/467 |
| 2011/0315414 A1 * | 12/2011 | Kuntner | .................. | B25B 23/14 173/1 |
| 2020/0256361 A1 * | 8/2020 | Nagel | ................. | B25B 23/1456 |

* cited by examiner

*Primary Examiner* — Jason L Vaughan

(57) ABSTRACT

Tooling systems and methods may be employed for installing a plurality of visually similar threaded fasteners to a plurality of assemblies. Each of the assemblies may have one or more threaded mating surfaces configured to receive different types of threaded fasteners, e.g., formed of different materials. The tooling system may include a tool(s) having a drive surface configured to install a threaded fastener by relative rotation of a gripping feature of the fastener with respect to a corresponding mating thread, each tool having a sensor disposed adjacent the drive surface and configured to detect a presence of the first material when a gripping feature of the one of the threaded fasteners of the first fastener type is positioned on the drive surface. The tooling system may also include a controller configured to determine the type of the selected threaded fastener based upon the sensor.

20 Claims, 5 Drawing Sheets

FASTENER ERROR PROOFING TOOL

INTRODUCTION

Manufacturers, e.g., of vehicles, may generally employ an assembly line where parts are assembled to a vehicle moving amongst different stations or cells on the assembly line. At a given station, it may be necessary to install several different types of parts or fasteners to the vehicles that are visually similar, e.g., having a same size, shape, and/or color, but which also have different performance characteristics, e.g., for different types or models of vehicles being assembled on the line.

For example, fasteners formed of different materials may be installed at a same location, e.g., in a given station on the assembly line, to different vehicles. Where the fasteners are difficult to visually distinguish, e.g., by having a similar or identical configuration, size, shape, and/or color, operators may occasionally install the wrong fastener to a vehicle. Moreover, the fasteners may require different installation speeds and/or torque values, and thus may be incorrectly installed. Simply utilizing multiple tools for installing the different fasteners does not sufficiently error-proof this operation, as it is still possible for the operator to (1) use the wrong fastener with the correct tool, (2) use the correct fastener with the wrong tool, or (3) use the wrong fastener with the wrong tool for a given vehicle.

Accordingly, there is a need for an improved system for installing parts that addresses the above shortcomings.

SUMMARY

In at least some example, a tooling system for installing a plurality of visually similar threaded fasteners to a plurality of assemblies may be employed. Each of the assemblies may have one or more threaded mating surfaces configured to receive the threaded fasteners, with the plurality of threaded fasteners including a first fastener type formed of a first material, and a second fastener type formed of a second material different from the first material. The tooling system may include one or more tools having a drive surface configured to install a selected threaded fastener by relative rotation of a gripping feature of the selected threaded fastener with respect to corresponding mating threads, each tool having a sensor disposed adjacent the drive surface and configured to detect a presence of the first material when a gripping feature of the one of the threaded fasteners of the first fastener type is positioned on the drive surface. The tooling system may also include a controller in communication with the one or more tools and configured to determine whether the selected threaded fastener is of the first or second fastener type based at least upon the sensor.

The sensor, in some examples, may be either a magnetic field sensor or a metallic proximity sensor.

In some examples, the tool includes a magnet.

The tool may include, in some example approaches, a socket.

In at least some examples, the socket may be configured to receive a head of the threaded fastener, which defines the gripping feature.

In some examples, the tool includes a magnet that is movably disposed within the tool.

In at least some examples, the tool may include a spring biasing the magnet toward a first position, wherein the magnet is configured to slide toward a second position when a fastener of the first fastener type is inserted into the socket.

In some examples, the tool may include first and second ring sensors spaced apart in a direction parallel to a sliding direction of the magnet, such that the ring sensors are configured to determine whether the magnet is in a first position or a second position.

In at least some examples, a tooling system may be provided for installing a plurality of visually similar threaded fasteners to a plurality of assemblies, with each of the assemblies having one or more threaded mating surfaces configured to receive the threaded fasteners, and the plurality of threaded fasteners including a first fastener type formed of a first magnetically susceptible material, and a second fastener type formed of a second material that is not magnetically susceptible. In some examples, the tooling system may include one or more tools having a drive surface configured to install a selected threaded fastener by relative rotation of a gripping feature of the selected threaded fastener with respect to corresponding mating threads, with each tool having a magnet disposed adjacent the drive surface. The tool may be configured to detect a magnetic force imparted by one of the threaded fasteners of the first fastener type when a gripping feature of the one of the threaded fasteners is positioned on the drive surface. The tool system may further include a controller in communication with the one or more tools and configured to determine whether the selected threaded fastener is of the first or second fastener type based at least upon the magnet.

In some examples, the tool includes a socket configured to receive a head of the threaded fastener, with the head of the threaded fastener defining the gripping feature.

In at least some example approaches, the tool includes a retention ring configured to retain the magnet within the tool.

The magnet may be, in some examples, movably disposed within the tool.

In some examples, the tool may include a spring biasing the magnet toward a first position.

In at least some example approaches, the magnet is configured to slide toward a second position when a fastener of the first fastener type is inserted into the socket.

In some examples, the tool includes first and second ring sensors spaced apart in a direction parallel to a sliding direction of the magnet, such that the ring sensors are configured to determine whether the magnet is in a first position or a second position.

In at least some example approaches, a tool may be provided for installing a plurality of visually similar threaded fasteners to a plurality of assemblies, with each of the assemblies having one or more threaded mating surfaces configured to receive the threaded fasteners, and the plurality of threaded fasteners including a first fastener type formed of a first magnetically susceptible material, and a second fastener type formed of a second material that is not magnetically susceptible. The tool may include a drive surface configured to install a selected threaded fastener by relative rotation of a gripping feature of the selected threaded fastener with respect to corresponding mating threads. The tool may also include a magnet disposed adjacent the drive surface and configured to detect a magnetic force imparted by one of the threaded fasteners of the first fastener type when a gripping feature of the one of the threaded fasteners is positioned on the drive surface.

In some of these examples, the tool includes a socket configured to receive a head of the threaded fastener, with the head of the threaded fastener defining the gripping feature.

In at least some example approaches, the magnet is movably disposed within the tool.

In some of these examples, the tool may include a spring biasing the magnet toward a first position, with the magnet being configured to slide toward a second position when a fastener of the first fastener type is inserted into the socket.

In at least some examples, the tool may include first and second ring sensors spaced apart in a direction parallel to a sliding direction of the magnet, such that the ring sensors are configured to determine whether the magnet is in a first position or a second position.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Example illustrations may be directed to systems and methods for producing assemblies, e.g., assembling vehicles as part of a sequential build process or on an assembly line. In some example illustrations, fasteners having similar or identical appearances but different characteristics may be distinguished by error-proofing or "smart" tools or systems. The different characteristics may include performance characteristics, material differences, or other characteristics not readily identified visually from the fasteners. In some example illustrations, a tool or controller may detect a material of a fastener inserted to the tool, e.g., to distinguish different fasteners such as aluminum and steel fasteners. Accordingly, example systems and methods generally ensure that the correct fastener is being installed to an assembly, and that the correct fastening parameters are used for the fastener type being driven. Example illustrations of these error-proofing systems may be combined with other error-proofing systems that ensure correct torque values and/or fastener counts in a given assembly step or process, thereby ensuring the correct fastener is installed with the correct installation process.

Example fasteners described herein include, but are not limited to, threaded bolts. As such, example processes and systems may be applied to other threaded fasteners such as nuts or even non-threaded fasteners. Moreover, example systems and methods herein may be applied in the context of any other type of parts where different parts are being installed at a given station or cell to an assembly. Example methods may be particularly beneficial where the different parts being installed are similar or identical in appearance, or where it may otherwise be difficult for an operator or assembly robots to visually distinguish the different parts.

Figure 1:
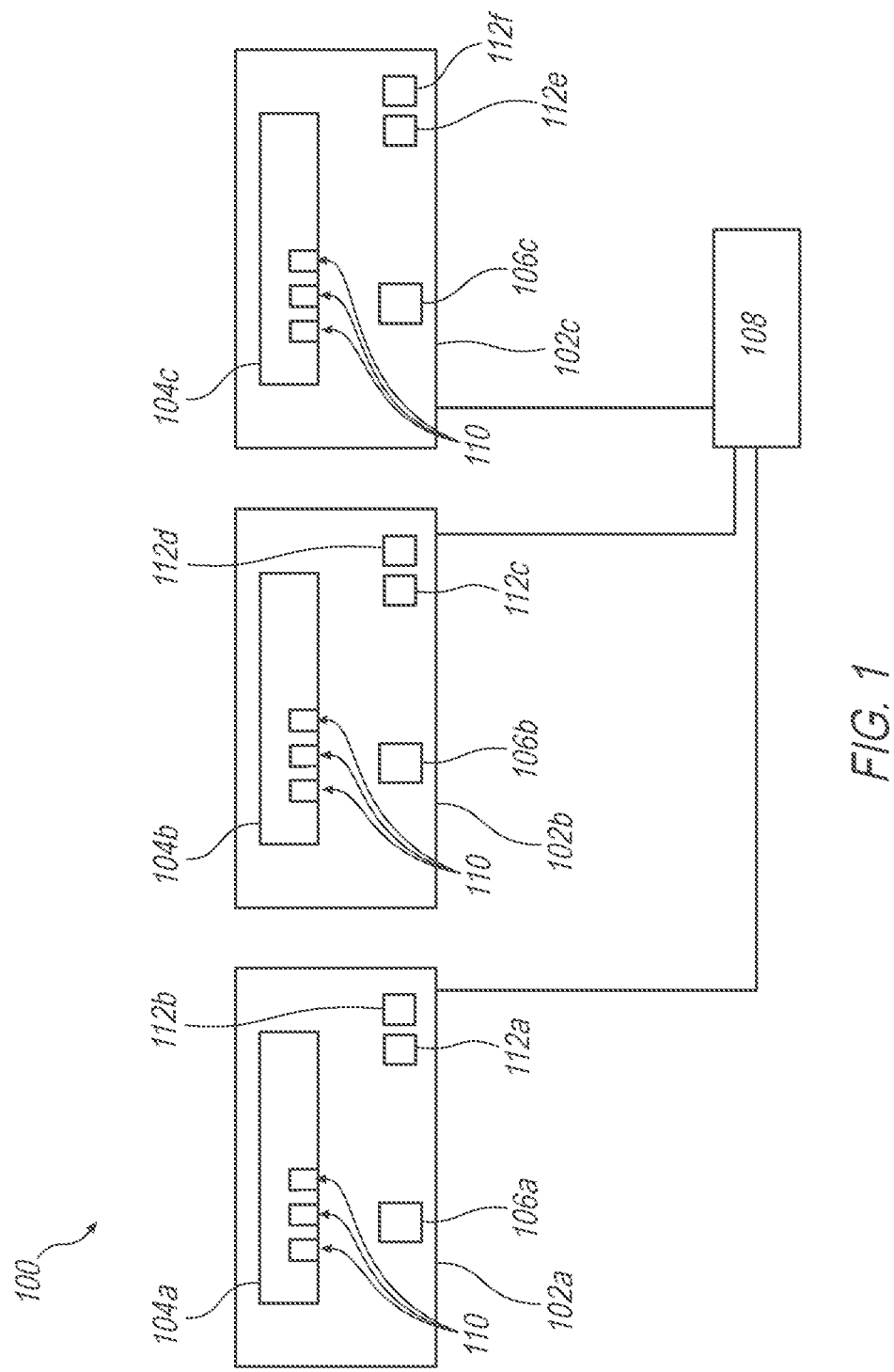
FIG. 1 is a schematic illustration of a system for producing assemblies from parts, according to one example approach.

Turning now to FIG. 1, an example tooling system 100 is illustrated. The system 100 may include a plurality of cells or stations 102a, 102b, 102c (collectively, 102) for building respective assemblies 104a, 104b, and 104c (collectively, 104). In one example, the assemblies 104 are moved amongst the stations 102, e.g., as in an assembly line process. In one example, different parts may be installed onto/into the assemblies 104 in each of the stations 102, with the assemblies 104 progressing from station 102a, to station 102b, and to station 102c.

Generally, collections of different parts (represented schematically in FIG. 1 by boxes 112) may be installed to the assemblies 104 at each of the stations 102. More specifically, as shown in FIG. 1, the parts 112 include two different types of fasteners 112a, 112b that are installed at station 102a, additional types of fasteners 112c, 112d that are installed at station 102b, and fasteners 112e, 112f that are both installed at station 102c. The parts may be different configurations or types of threaded fasteners, e.g., bolts, nuts, studs, or the like. As will be seen in the examples below, the parts 112 are illustrated as threaded bolts, each of which are installed to corresponding threaded apertures 110 of the assemblies 104. Other types of fasteners may be employed in connection with example illustrations herein, such as nuts, studs, or non-threaded fasteners, or even entirely different kinds of parts.

In the examples that follow, the fasteners 112 are illustrated and described as different types of threaded bolts that are visually similar. More specifically, the fastener 112a may be a threaded bolt formed of an aluminum-based material, while the fastener 112b may be a threaded bolt formed of a steel material. While two different types of fasteners 112 are shown at each station 102, there is no limitation on the number of types of parts or fasteners that may be installed to the assemblies 104 at each station 102.

Each of the stations 102 also has one or more tools 106 for installing the different types of parts/fasteners 112. The tools 106 may be capable of driving fasteners having different performance characteristics, e.g., by varying torque or speed to drive different fasteners 112 in a manner consistent with their different characteristics. While each station 102 is shown with a single tool 106, in other examples multiple tools 106 may be present at each station 102, e.g., with each tool 106 being dedicated to a different type or configuration fastener 112, such as by providing different torque and/or rotational speed characteristics for installation of the fasteners 112.

As illustrated in FIG. 1, station 102a has a tool 106a, station 102b has a tool 106b, and station 102c has a tool 106c. In the examples that follow, tool 106a is configured to drive the aluminum fastener 112a with a predetermined torque and speed. The tool 106a may also have variable installation parameters such as the torque, the speed, and/or the installation time, as may be needed to drive a different fastener, e.g., the steel fastener 112b. Thus, the tool 106 may be configured to alter at least one of the speed, torque, and/or installation time to allow driving the aluminum fastener 112a or the steel fastener 112b. As a result, to ensure an appropriate installation of the fasteners 112a, 112b to their respective assemblies 104, the correct installation parameters for the tool 106a should generally be used for installing the fasteners 112a, 112b, respectively. As noted above, the assemblies 104 may each define a plurality of threaded apertures 110, and the apertures 110 may receive the fasteners 112a, 112b, e.g., to secure another part to the assembly 104 or to secure parts of the assembly 104 together.

As will be described further in the examples below, one or more of the parts 112 being installed to the assemblies 104 in any of the stations 102 may be visually similar or identical. For example, the fasteners 112a, 112b installed into corresponding threaded apertures 110 of the assemblies 104 at station 102a may be a same size, configuration, and/or color. In one example, the fasteners 112a, 112b are a substantially identical length, head configuration (e.g., M6 hex), head size, and color. Thus, visually distinguishing the fasteners 112a, 112b from each other may be difficult or prone to error by an operator or installation robot.

The system 108 also includes a controller 108 that is in communication with the stations 102a, 102b, 102c, e.g., via wired or wireless communication. The controller 108 may thus communicate generally with the stations 102 or components thereof such as the tools 106, or with a controller or an operator(s) associated with the station(s) 102. As will be discussed further below, the controller 108 may receive an indication from a tool 106 indicating that a fastener 112 has been positioned in the tool 106 for installation, and/or that the fastener 112 that has been positioned for installation, e.g., in the tool 106, is the correct (or incorrect) fastener 112 for a given assembly 104. The controller 108 may provide a signal or other output, e.g., adjusting installation parameters of the tool 106, upon confirmation that a correct fastener 112 is positioned in the tool 106 for the given assembly 104. Thus, an operator may receive a confirmation that the correct fastener 112 has been selected by the operator for installation to the assembly 104. The controller 108 may also output a signal, e.g., to a display or by outputting an audible alarm (not shown in FIG. 1), to indicate that an incorrect fastener 112 or tool 106 is being employed for a given assembly 104. While a single controller 108 is illustrated in FIG. 1, it should be understood that additional controllers or subcontrollers may be used. For example, one or more of the stations 102 may have a dedicated controller. Moreover, the controller(s) 108 may be incorporated directly into one or more of the tools 106 in some example approaches. The controller(s) 108 may include at least one processor and memory, including a non-transitory computer readable memory storing instructions (e.g., software) that are accessible by the processor for carrying out the processing performed by the controller 108.

Figure 2A:
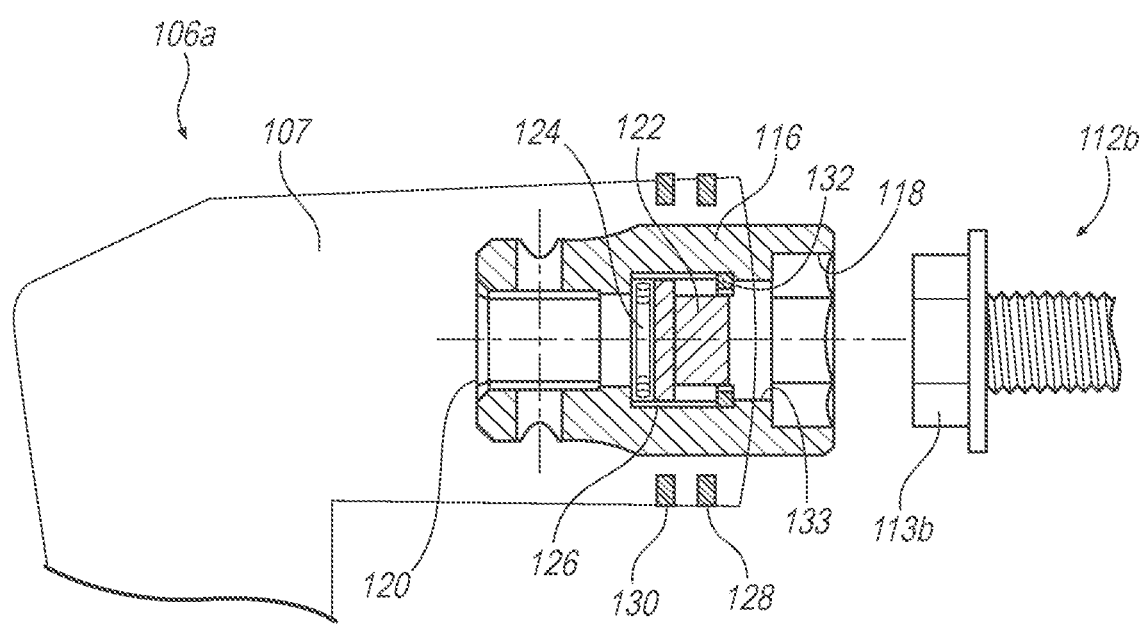
FIG. 2A is a partial section view of a tool for the system of FIG. 1, according to one example.
Figure 2B:
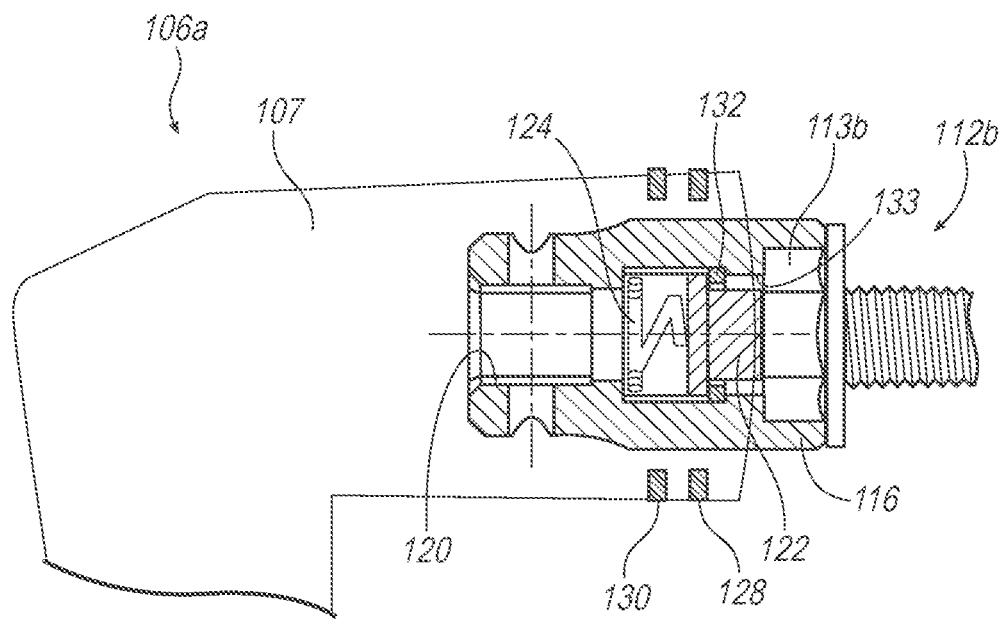
FIG. 2B is a partial section view of the tool of FIG. 2A installing a first type of fastener, according to an example.
Figure 2C:
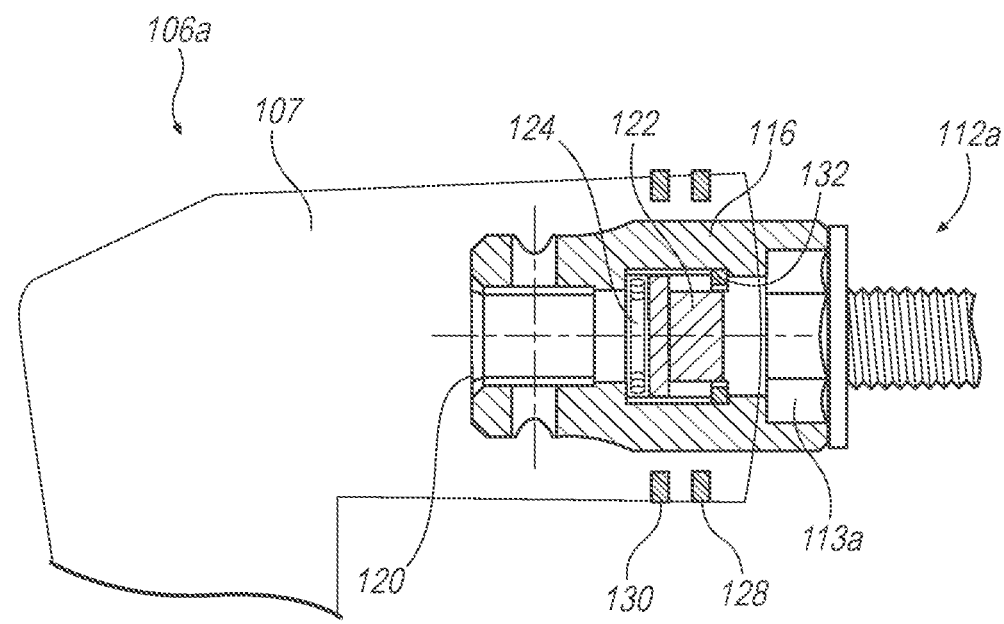
FIG. 2C is a partial section view of the tool of FIG. 2A installing a second type of fastener, according to one example.

Turning now to FIGS. 2A-2C, an example tool 106 is illustrated in further detail. For purposes of the following example illustrations, tool 106a of the station 102a is illustrated. However, the principles discussed below may be applied in the context of any one or more of the other tools 106b, 106c, etc., without limitation. Moreover, as noted above, there may be additional tools 106 present in a single station 102 similar or identical to tool 106a as described below.

The tool 106a, as best seen in FIG. 2A, may include a handle or main body 107 configured to facilitate handling/positioning of the tool 106a, e.g., for installing fasteners 112 to an assembly 104 (not shown in FIG. 2A). The tool 106a may also have a rotatable driver 116 that is turned by a shaft 120. For example, the driver 116 may be a socket, as illustrated in FIGS. 2A-2C. The shaft 120 may be driven by a motor (not shown). The shaft 120 may turn the driver 116 at a desired rotational speed and/or apply a desired torque via the driver 116. The driver 116 may have a cavity configured to receive a head portion 113 of the fastener 112a. As illustrated, the driver 116 may define a drive surface 118 that is sized to generally match a gripping feature of the fastener 112a, e.g., the head 113 of the fastener 112a, such that the driver 116 may securely drive/rotate the fastener 112a. The rotation of the fastener 112a may allow a threaded end of the fastener 112a opposite the gripping feature/head 113 to be driven into corresponding mating threads of one of the assemblies 104 (not shown).

The tool 106a may include one or more sensors 128, 130 to facilitate determining a material or composition of the fastener 112a. In the example illustrated in FIGS. 2A-2C, two magnetic field sensors 128, 130 are provided which detect a position of a slidable magnet 122. The sensors 128, 130, which may be generally ring-shaped, are configured to detect a magnetic field generated by the permanent magnet 122. Merely as examples, the sensors 128, 130 may each detect a presence or absence of a magnetic field, a strength of a magnetic field, or a relative difference in magnetic field strength between the two sensors 128, 130. The magnet 122 may be biased into a first position, e.g., by a spring 124 as illustrated in FIG. 2A. The magnet 122 may be slidably disposed within a sleeve 126, which may be formed of bronze or any other suitable material, to allow the magnet 122 to slide to a second position, as will be discussed further below. The magnet 122 may be retained within the tool 106a by a retention ring 132. In one example, the retention ring 132 is a split or snap ring, which generally comprises a split ring that defines a greater diameter initially than the cavity within the driver 116, such that the retention ring 132 is maintained within the driver 116 by the relatively smaller diameter of a shoulder portion 133 defined by the driver 116. The magnet 122 may be used to distinguish between the fasteners 112a, 112b as a result of whether or not an inserted fastener is formed of a magnetically susceptible material.

For example, as shown in FIG. 2A, fastener 112b, which is formed of a steel or otherwise magnetically susceptible material, may be brought adjacent to the tool 106a, e.g., by an operator or machine (not shown). In FIG. 2B, a gripping feature such as the head portion 113b of the fastener 112b may be inserted into the driver 116 of the tool 106a. As the head 113b of the fastener 112b is inserted into the driver 116, the magnet 122 slides toward the head 113b as a result of the magnetic attraction of the magnet 122 to the head 113b of the steel fastener 112b, which overcomes retention force provided by the spring 124. More specifically, the spring 124 may generally maintain the magnet 122 in a first position, i.e., further away from the driver 116, in the absence of the steel fastener 112b being placed in the driver 116. The sensors 128, 130 may detect movement of the magnetic field generated by the permanent magnet 122 as it moves from the first position to a second position closer to the driver 116 and/or the head 113b of the fastener 112b.

The sensors 128, 130 may be any type of sensor configured to detect movement of the magnet 122. While two sensors 128, 130 are illustrated as being axially spaced from one another (e.g., to detect axial movement of the magnet 122 between the first and second positions) in FIGS. 2A-2C, in other examples a different number of sensors may be employed. Moreover, a single sensor may be used in some example approaches. In one example illustration, the sensors 128, 130 are both reed switches, with an internal moveable reed (not shown) that is formed of a metallic or otherwise magnetically susceptible material. The reed may be moved or otherwise may detect magnetic force applied as a result of movement of the magnet 122 to/from the vicinity of the sensors 128, 130.

Turning now to FIG. 2C, the tool 106a is illustrated with a gripping feature (e.g., head 113a) of a different type of fastener 112a inserted into the driver 116, which is formed of a non-magnetically susceptible material. In this particular example, the fastener 112a is formed of an aluminum material. Accordingly, the magnet 122 remains in the first position as a result of the retention force of the spring 124, and the lack of attractive force between the magnet 122 and the head 113a of the aluminum fastener 112a. Accordingly, the sensors 126, 128 may detect that the magnet 122 remains in the first position, as illustrated in FIG. 2C.

The tool 106a, as noted above, may be in communication with controller 108. The tool 106a may thus provide a signal or otherwise communicate with the controller 108 to indicate which fastener 112a or 112b is positioned in the tool 106a. The controller 108 may control installation settings associated with the fasteners 112a, 112b and the tool 106a. More specifically, upon confirmation that the aluminum fastener 112a is installed into the tool 106a, the controller 108 may set rotational speed and/or output torque of the tool 106a to limits appropriate for the installation of the aluminum fastener 112a. Alternatively, upon confirmation that the steel fastener 112b is installed into the tool 106a, the controller 108 may set rotational speed and/or output torque of the tool 106a to limits appropriate for the installation of the steel fastener 112b. As a result, the controller 108 may ensure that appropriate installation parameters are used for each of the fasteners 112a, 112b.

In some example approaches, the controller 108 may also confirm that the correct one of the fasteners 112a, 112b are installed to a given assembly 104. For example, the assembly 104a (see FIG. 1) may have a certain equipment level or option content requiring the use of only the aluminum fastener 112a in the corresponding threaded aperture(s) 110. Accordingly, before allowing use of the tool 106a when the assembly 104a is positioned in the station 102a, the controller 108 confirms that the appropriate fastener 112a is positioned in the tool 106a. The controller 108 may also adjust installation setting(s) of the tool 106a as appropriate for the aluminum fastener 112a, e.g., by changing a rotational speed and/or torque output of the tool 106a. A different assembly 104 may require the use of steel fasteners 112b in the same threaded aperture(s) 110, e.g., the threaded apertures 110 of the assembly 104b. Accordingly, upon the positioning of the assembly 104b in the station 102a, the controller 108 may activate the tool 106a and control appropriate settings (e.g., rotational speed, output torque, etc.) of the tool 106a upon confirmation that the correct steel fastener 112b is positioned in the tool 106a and ready to be installed into the aperture(s) 110.

Figure 3:
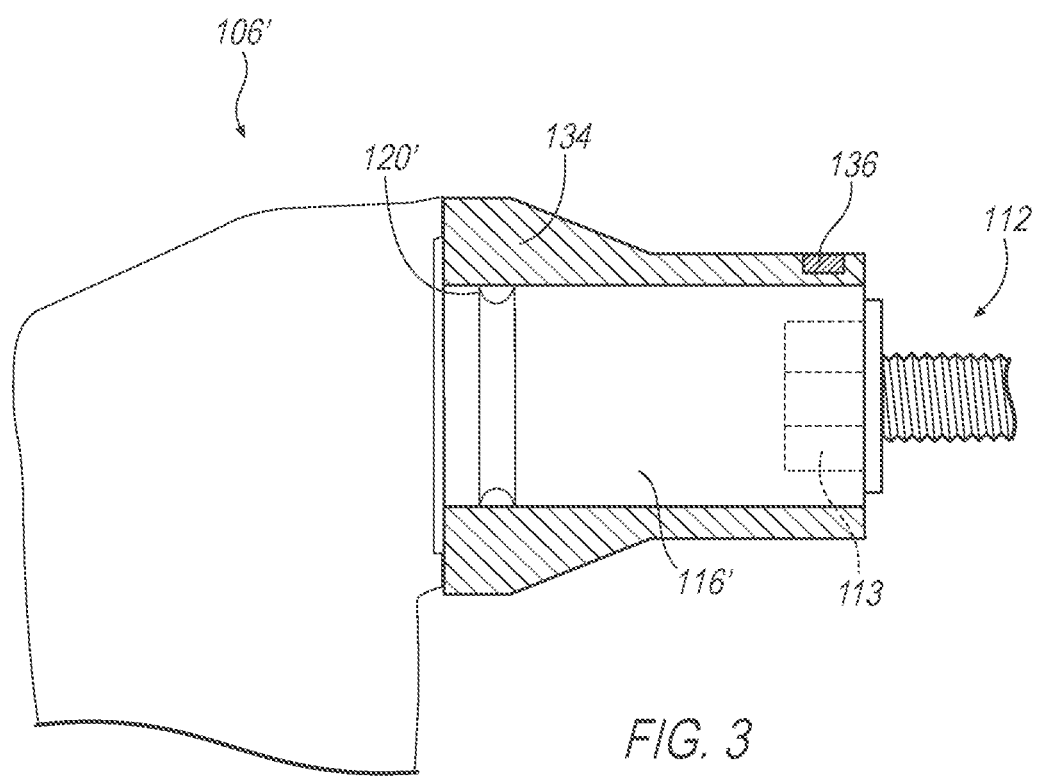
FIG. 3 is a partial section view of another tool for the system of FIG. 1, according to one example.

Turning now to FIG. 3, another example tool 106' is illustrated. In contrast to the tool 106 described above, tool 106' employs a single ferrous/non-ferrous sensor 136 to determine a material of the fastener 112 upon insertion into the tool 106'. The tool 106' may have a driver 116' which is rotatably driven by a shaft 120' to install a fastener 112. The driver 116' may be positioned within a stationary outer sleeve 134. The sensor 136 may be a proximity sensor configured to detect when a metallic (e.g., ferrous) material is brought into the vicinity of the sensor 136, e.g., when the head 113b of the steel fastener 112b is located within the driver 116'. The driver 116' may be formed of a non-ferrous material to prevent interference with the sensor 136, to the extent necessary to prevent false positive signals being output by the sensor 136. Accordingly, depending upon the proximity-detecting capabilities of the sensor 136, the tool 106' may generally detect a presence or absence of a given material (e.g., metal, iron, etc.) and thereby distinguish different fastener types on that basis. In one example, different types of fasteners 112 may include metallic (e.g., ferrous) and non-metallic (e.g., plastic) fastener types, which are distinguished by the tool 106'.

Figure 4:
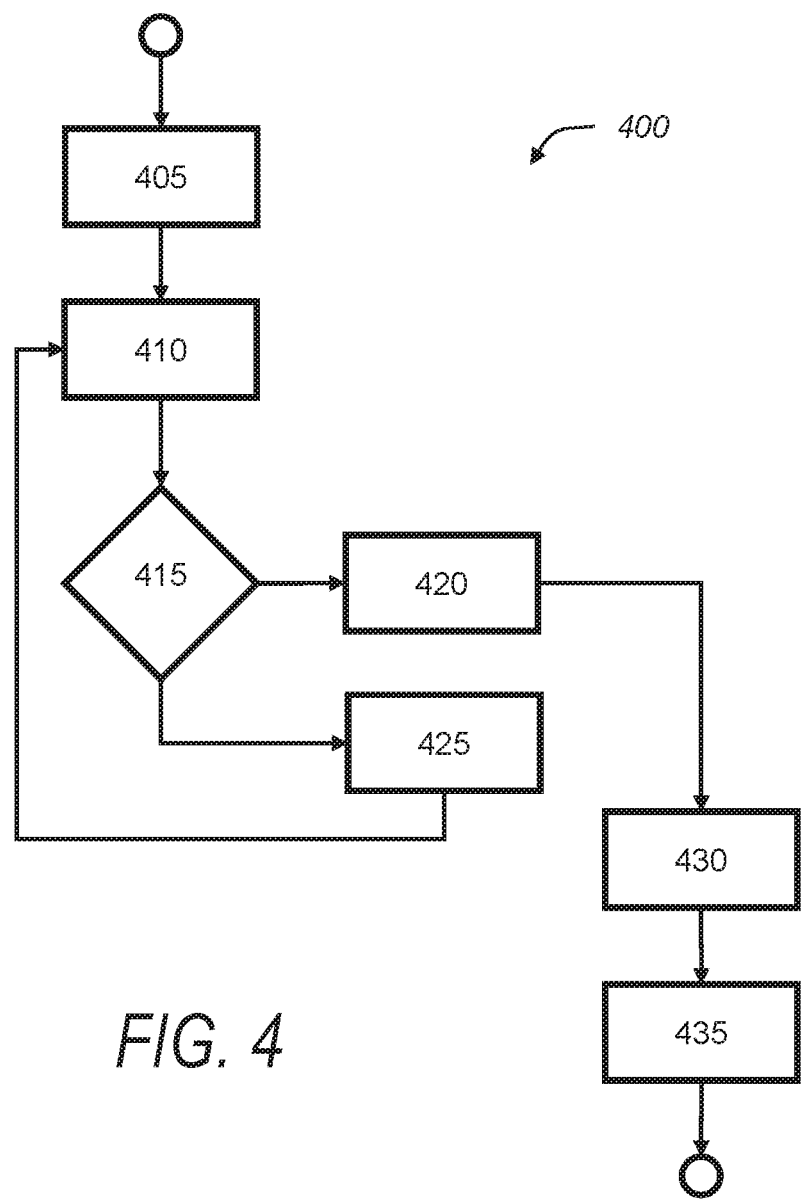
FIG. 4 is a process flow diagram for an example method of producing assemblies from parts.

Turning now to FIG. 4, an example process for determining fastener types, e.g., in a system such as system 100, is disclosed. Process 400 may begin at block 405, where an assembly is positioned for installation of one or more parts. As discussed above, in some example illustrations, the parts to be installed may include different fasteners 112 that have a similar or identical visual appearance, e.g., a similar or identical size, shape, and/or color. For example, as discussed above the fasteners 112 may include a plurality of fastener types, such as a first fastener type 112a formed of an aluminum material, and a second fastener type 112b formed of a steel material. As discussed above, an assembly, e.g., assembly 104a, may be positioned in a given cell or station 102a.

Proceeding to block 410, a fastener may be inserted into a tool for installation into the assembly. For example, as described above an operator or robot may receive instructions or other indication of a particular type of fastener 112 that is appropriate for the assembly 104a. For example, an operator may be instructed visually, audibly, or otherwise to select the steel fastener 112b for the assembly 104a. Accordingly, the operator may select one of the fasteners 112b and insert the fastener 112b into the tool 106a. The operator or robot may then confirm that a fastener has been inserted into the tool 106a. In other example approaches, the tool 106a or system 100 may automatically detect insertion of the fastener 112, e.g., via an additional sensor(s) in the tool 106a or elsewhere in the station 102a.

Proceeding to block 415, process 400 may query whether the part identified by the operator/robot is the correct type. For example, proceeding with the foregoing example, the controller 108 may determine, using the sensors 128, 130 or sensor 126, whether the fastener inserted into the tool 106a is the first type, i.e., fastener 112b formed of a steel material, that had been identified as being the correct fastener type for the assembly 104a in block 410. The tool 106a may, for example, rely upon the sensor(s) 128, 130 or sensor 136 to determine that the inserted fastener is the steel fastener 112b.

If process 400 determines in block 415 that the fastener 112 inserted into the tool 106a is the correct type (in this example, steel fastener 112b), process 400 may proceed to block 420. At block 420, controller 108 may establish one or more installation parameters appropriate for the tool 106a and/or the confirmed part (here, steel fastener 112b). Merely as examples, the controller 108 may activate or turn on a motor of the tool 106a (i.e., to allow the operator or robot to continue with installation of the part, as described further below), and/or may set an installation torque, rotational speed, installation time, or other installation parameter appropriate for the confirmed part or fastener 112.

Alternatively, if at block 415 it is determined that the incorrect part has been identified (e.g., the operator erroneously inserted an aluminum fastener 112a into the tool 106a), process 400 may proceed to block 425. At block 425, remedial action may be taken with respect to the operator error. For example, an alarm or other notification may be provided to the operator and/or the controller 108, tool 106a may be deactivated, etc. Process 400 may proceed back to block 410, i.e., to allow the operator or robot to replace the previously identified/inserted part with a new part or fastener of the correct type.

Upon confirmation in block 415 that the correct part/fastener has been identified for the tool, process 400 may ultimately proceed from block 420 to block 430. At block 430, the confirmed part may be installed to the assembly. Continuing with the example above, the fastener 112 may be driven by the tool 106a into the assembly 104a. Where the fastener 112 is a threaded bolt as described above, the assembly 104a may have one or more corresponding threaded apertures or nuts, to which the fastener 112 is secured using the tool 106a. Process 400 may then proceed to block 435.

At block 435, the assembly to which the part is installed may be removed from the station 102, or installation may otherwise be finalized. For example, as discussed above, upon installation of the one or more parts 112 to the assembly 104a in station 102a, assembly 104a may be moved to subsequent stations, e.g., 104b and/or 104c. Process 400 may then terminate.

The example system 100 and process 400 may generally reduce errors in installation of parts to an assembly by allowing confirmation of correct parts to be installed. The error proofing tooling system and methods described herein may generally detect differences, e.g., in material types such as aluminum and steel, to ensure that correct fastener(s) or other types of parts are selected by an operator or robot for installation. By ensuring that the correct fastener style and installation parameters are used, warranty and repair costs may be reduced.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A tooling system for installing a plurality of visually similar threaded fasteners to a plurality of assemblies, each of the assemblies having one or more threaded mating surfaces configured to receive the threaded fasteners, the plurality of threaded fasteners including a first fastener type formed of a first material, and a second fastener type formed of a second material different from the first material, the tooling system comprising:
    one or more tools having a drive surface configured to install a selected threaded fastener by relative rotation of a gripping feature of the selected threaded fastener with respect to corresponding mating threads, each tool having a sensor disposed adjacent the drive surface and configured to detect a presence of the first material when a gripping feature of the one of the threaded fasteners of the first fastener type is positioned on the drive surface; and
    a controller in communication with the one or more tools and configured to determine whether the selected threaded fastener is of the first fastener type or the second fastener type based at least upon the sensor.

2. The tooling system of claim 1, wherein the sensor is one of a magnetic field sensor or a metallic proximity sensor.

3. The tooling system of claim 1, wherein the tool includes a magnet.

4. The tooling system of claim 1, wherein the tool is a socket.

5. The tooling system of claim 4, wherein the socket is configured to receive a head of the threaded fastener, the head of the threaded fastener defining the gripping feature.

6. The tooling system of claim 5, wherein the tool includes a magnet that is movably disposed within the tool.

7. The tooling system of claim 6, further comprising a spring biasing the magnet toward a first position, wherein the magnet is configured to slide toward a second position when a fastener of the first fastener type is inserted into the socket.

8. The tooling system of claim 6, further comprising first and second ring sensors spaced apart in a direction parallel to a sliding direction of the magnet, such that the ring sensors are configured to determine whether the magnet is in a first position or a second position.

9. A tooling system for installing a plurality of visually similar threaded fasteners to a plurality of assemblies, each of the assemblies having one or more threaded mating surfaces configured to receive the threaded fasteners, the plurality of threaded fasteners including a first fastener type formed of a first magnetically susceptible material, and a second fastener type formed of a second material that is not magnetically susceptible, the tooling system comprising:
    one or more tools having a drive surface configured to install a selected threaded fastener by relative rotation of a gripping feature of the selected threaded fastener with respect to corresponding mating threads, each tool having a magnet disposed adjacent the drive surface, the tool configured to detect a magnetic force imparted by one of the threaded fasteners of the first fastener type when a gripping feature of the one of the threaded fasteners is positioned on the drive surface; and
    a controller in communication with the one or more tools and configured to determine whether the selected threaded fastener is of the first fastener type or the second fastener type based at least upon the magnet.

10. The tooling system of claim 9, wherein the tool includes a socket configured to receive a head of the threaded fastener, the head of the threaded fastener defining the gripping feature.

11. The tooling system of claim 9, further comprising a retention ring configured to retain the magnet within the tool.

12. The tooling system of claim 9, wherein the magnet is movably disposed within the tool.

13. The tooling system of claim 12, further comprising a spring biasing the magnet toward a first position.

14. The tooling system of claim 13, wherein the magnet is configured to slide toward a second position when a fastener of the first fastener type is inserted into the socket.

15. The tooling system of claim 9, further comprising first and second ring sensors spaced apart in a direction parallel to a sliding direction of the magnet, such that the ring sensors are configured to determine whether the magnet is in a first position or a second position.

16. A tool for installing a plurality of visually similar threaded fasteners to a plurality of assemblies, each of the assemblies having one or more threaded mating surfaces configured to receive the threaded fasteners, the plurality of threaded fasteners including a first fastener type formed of a first magnetically susceptible material, and a second fastener type formed of a second material that is not magnetically susceptible, the tool comprising:
- a drive surface configured to install a selected threaded fastener by relative rotation of a gripping feature of the selected threaded fastener with respect to corresponding mating threads; and
- a magnet disposed adjacent the drive surface and configured to detect a magnetic force imparted by one of the threaded fasteners of the first fastener type when a gripping feature of the one of the threaded fasteners is positioned on the drive surface.

17. The tool of claim 16, wherein the tool includes a socket configured to receive a head of the threaded fastener, the head of the threaded fastener defining the gripping feature.

18. The tool of claim 16, wherein the magnet is movably disposed within the tool.

19. The tool of claim 18, further comprising a spring biasing the magnet toward a first position, wherein the magnet is configured to slide toward a second position when a fastener of the first fastener type is inserted into the socket.

20. The tool of claim 16, further comprising first and second ring sensors spaced apart in a direction parallel to a sliding direction of the magnet, such that the ring sensors are configured to determine whether the magnet is in a first position or a second position.

\* \* \* \* \*